(12) United States Patent
Meier et al.

(10) Patent No.: US 6,467,480 B1
(45) Date of Patent: Oct. 22, 2002

(54) PROCEDURE AND DEVICE FOR THE MOVEMENT AND VOLUME MEASUREMENT OF FLUIDS AND GASES AND DEVICE FOR THE IMPLEMENTATION OF A RESPIRATION

(75) Inventors: Bernd Horst Meier, Darmstadt; Helmut O. Heinemann, Kelkheim, both of (DE)

(73) Assignee: Bernd Horst Meier, Darmstadt (DE)

( * ) Notice: Subject to any disclaimer, the term of this patent is extended or adjusted under 35 U.S.C. 154(b) by 0 days.

(21) Appl. No.: 09/387,521

(22) Filed: Sep. 1, 1999

(30) Foreign Application Priority Data

Sep. 9, 1998 (DE) .......................................... 198 41 173

(51) Int. Cl.[7] .............................................. A61M 16/00
(52) U.S. Cl. ............................... 128/204.28; 128/205.24
(58) Field of Search ....................... 128/204.18, 204.19, 128/204.21, 204.22, 204.24, 204.25, 204.28, 204.29, 205.11, 205.13–205.18, 205.25, 205.24; 600/529, 538, 540; 73/239, 247, 240, 252; 137/247, 247.13, 511, 513.7, 625, 625.15, 625.17, 625.21, 625.31, 625.41, 625.46

(56) References Cited

U.S. PATENT DOCUMENTS

| | | | | |
|---|---|---|---|---|
| 4,244,061 A | * | 1/1981 | Webster et al. | |
| 4,284,103 A | * | 8/1981 | Pemberton | |
| 5,123,817 A | * | 6/1992 | Willemsen | 141/290 |
| 5,241,955 A | * | 9/1993 | Dearman et al. | 128/204.18 |
| 5,316,042 A | * | 5/1994 | Lim et al. | |
| 5,408,886 A | * | 4/1995 | Lalin | 73/248 |
| 5,490,499 A | * | 2/1996 | Heinonen et al. | 128/203.28 |
| 5,531,221 A | * | 7/1996 | Power et al. | 128/204.18 |
| 5,546,801 A | * | 8/1996 | Swinson et al. | 73/238 |
| 5,562,002 A | * | 10/1996 | Lalin | 73/241 |
| 5,686,663 A | * | 11/1997 | Spalding | 73/247 |
| 5,704,396 A | * | 1/1998 | Brillant et al. | |
| 5,811,676 A | * | 9/1998 | Spalding et al. | 73/197 |
| 6,032,528 A | * | 3/2000 | Storrar | 73/249 |
| 6,089,102 A | * | 7/2000 | Bloss | 702/46 |
| 6,202,483 B1 | * | 3/2001 | Barcus | 222/639 |
| 6,212,959 B1 | * | 4/2001 | Perkins | 73/861.74 |
| 6,302,653 B1 | * | 10/2001 | Bryant et al. | 417/383 |
| 6,306,099 B1 | * | 10/2001 | Morris | 600/529 |
| 6,314,822 B1 | * | 11/2001 | Ford | 73/861.74 |
| 6,332,463 B1 | * | 12/2001 | Farrugia et al. | 128/204.18 |
| 6,378,556 B1 | * | 4/2002 | Fondse | |

* cited by examiner

*Primary Examiner*—Aaron J. Lewis
*Assistant Examiner*—Teena Mitchell
(74) *Attorney, Agent, or Firm*—Birch, Stewart, Kolasch & Birch, LLP

(57) ABSTRACT

A device and method for movement and measurement of fluid volumes involves defining a fluid volume in a measuring chamber of a rotation vessel by at least first and second pistons movable within the measuring chamber, with the first and second pistons separating and indicating the volume of fluid moved into and out of the measuring chamber via flow-regulating valves. A holding means alternately holds the first and second pistons at fixed positions within the measuring chamber while the other piston rotates. A device and method of respiration involves a respirator including a plurality of flexible gas bags and a stiff gas tank with a first flexible gas bag positioned inside a second flexible gas bag and both gas bags being positioned inside the stiff tank. The respirator is connected to the device for the movement and measurement of fluid volumes via respirator valves.

23 Claims, 10 Drawing Sheets

US 6,467,480 B1

PROCEDURE AND DEVICE FOR THE MOVEMENT AND VOLUME MEASUREMENT OF FLUIDS AND GASES AND DEVICE FOR THE IMPLEMENTATION OF A RESPIRATION

This application claims a foreign priority from German Application No. 198 41 173.1, filed Sep. 9, 1998.

BACKGROUND OF THE INVENTION

Mechanical volume measurement of gases and fluids is performed using turbines, bellow systems, piston systems and rotameters.

An important feature of volume measurement is the precise measurement of gas or liquid volumes without impairing effects upon pressure and flow dynamics of the volumes to be measured.

The simplest procedure is to fill an unknown amount of a gas or liquid into a vessel with a known volume. If pistons and cylinders or bellows are used, the volume to be measured is filled into the measuring chamber, and unloaded after measurement. The filling and unloading process requires flow regulating valves, which are in most cases driven in a two cycle mode. As a consequence the gas flow is frequently disrupted. Turbine volumeters are used to measure gas flows continuously. The volume to be measured is driven against a turbine and derived from a revolution counter. Procedures using turbine effects are additionally afflicted by flow dynamic factors like velocity and mass of the volume driven upon the turbine. The gas volume is derived from the amount of rotations, which were performed. If the gas flow is interrupted, the turbine should be stopped. The inertia of the system causes both a retarded starting when the gas volume begins to flow, and a retarded resting if the gas flow has been stopped. That is why a number of flow interrupts or flow changes decrease the accuracy. Other systems providing flow measurements are rotameters. In rotameters a continuous gas volume flows through a tube with an increasing diameter, the position of an indicator, which occludes the minimal diameter of the tube, indicates the amount of the volume flow passing through the system. The accuracy of the system depends on a constant flow. Rotameters directly obtain a volume flow per time but not a volume.

SUMMARY OF THE INVENTION

The invention refers to a procedure and a device for the movement and/or the measurement of fluid or gas volumes, characterized by at least two alternately cycling pistons or blades, built into a rotation parabolic shaped vessel, turning around one pivot point, whereas the volume to be measured is filled into a space between one of the piston/blades which is held at a fixed position and the other movable piston/blade; wherein rotationally at least, the one piston is held fixed and at least the other piston is moved. A respirator for carrying out the invention for the movement, measurement and regulation of the respiration gas includes a gas containing system comprising a plurality of gas bags one inserted into the other.

In an alternative example of the invention the pistons are not pivoted, but are circling in a tubular pipe system, which can be circular, while a volume to be measured is moved into a space between at least one of the pistons, which is held at a fixed position and at least the other second, piston, which is movable.

An additional example is characterized by at least two alternately cycling bellows, which are connected with each other, with the two bellows forming furthermore a circular structure, which is subdivided by completion plates into at least two chambers. A volume, which is moved into one of the bellows is compensated by an outflow of an aliquot volume from the other of the bellows. Completion plates of the bellows are alternately moved and held tight.

In an additional arrangement a flow driven motor or generator is derived from the feature of pistons or plates rotating in a rotation shaped vessel.

In an additional arrangement, the procedure and/or the device can be used as a pump, if the system is supplied by outward energy.

DETAILED DESCRIPTION OF THE PREFERRED EMBODIMENTS

Figure 1:
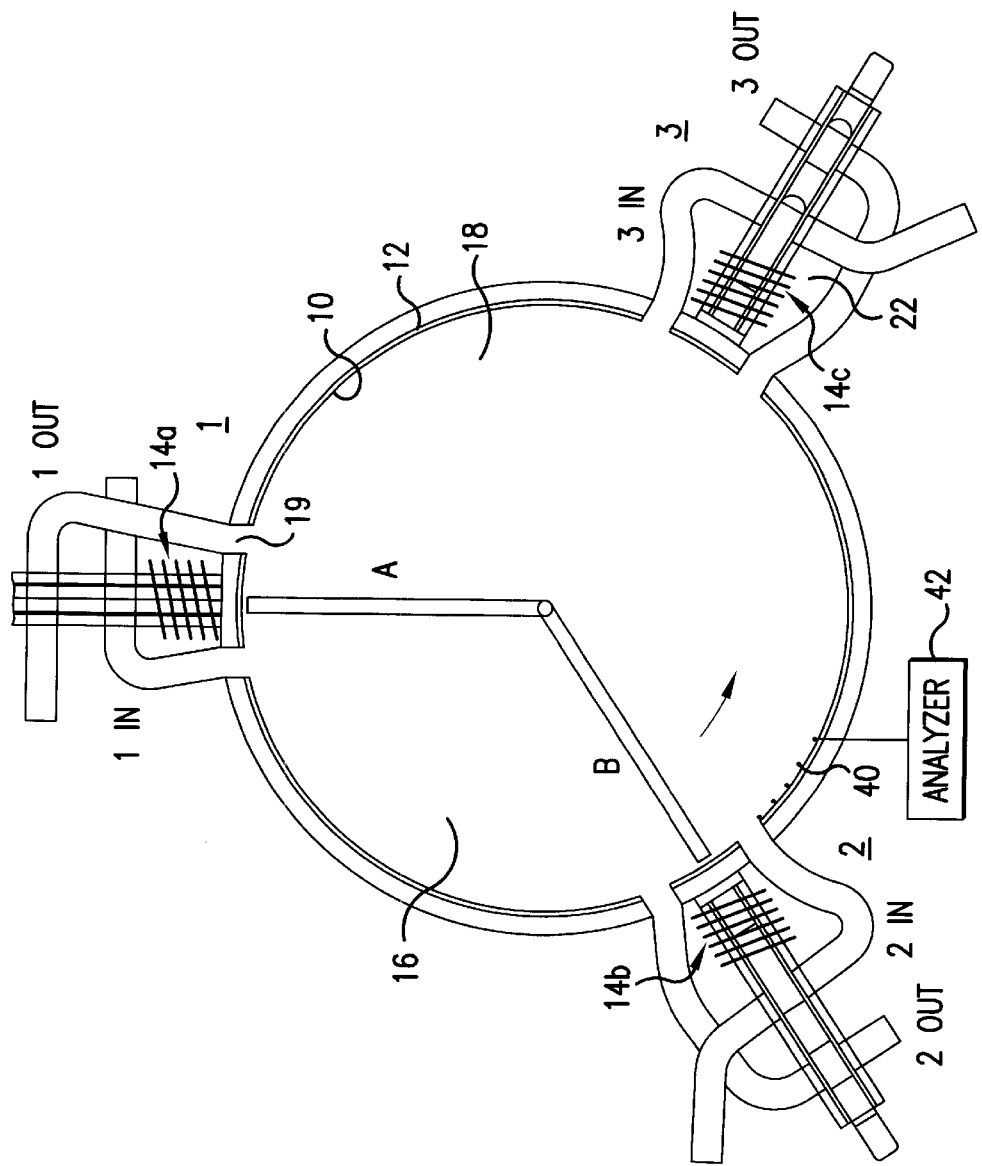
FIGS. 1–3 are schematic cross-sectional views of a first embodiment of a device for the movement and volume measurement of fluids according to this invention, with each view showing a different operational position of a respective one of a first, second and third cycle phase.

The invention comprises of a measuring chamber 10 of a rotation vessel 12 with a known volume and two pistons or plates (completion plates) which insulate and indicate a volume moved in. The amount of the volume brought into the space between the pistons can be derived from the position of each piston. One exemplary device carrying out the invention comprises first and second pistons A, B, which are pivoted, with a first volume to be measured being moved into a first measuring space 16 between at least the first piston/plate A, which is held in a fixed position 14a by one holding means 14a of holding means 14a, 14b, 14c and at least the second movable piston/plate B. The non-fixed piston/plate B is moved by the expanding volume, and another corresponding second volume in a measuring space 18 of the parabolic rotation vessel 12, which is insulated from the other volume by the two pistons A, B, is displaced and moved through an outlet 19. In Figure (1) the piston A is situated as a first piston at the holding position 1 and the piston B as second piston B at position 2. The valves (1 IN) and (1 OUT) are opened, all other valves are closed. If the piston A is the first piston, which is held fixed at position (1) (for example by a magnetic force or a lock pin) and the volume is moved through inlet (1 IN) into the space lying at the counterclockwise side of the first piston A, the second piston B would move in a counterclockwise direction towards position 3, whereas the volume lying at the counterclockwise side of piston B would be moved outward through the outlet 19 (1 OUT). FIG. (2) illustrates the situation after piston B has reached position 3. Now piston B becomes the first piston, which is held tight at position 3 and piston A becomes the second piston which is released. Simultaneously the Valves (1 IN) and (1 OUT) become closed and the valves (3 IN) and (3 OUT) are opened. If the piston B is the first piston which is held tight at position 3 and the volume is moved via inlet (3 IN) into the space lying at the counterclockwise side of piston B piston A would be moved counterclockwise toward position 2, and the volume of the space lying at the counterclockwise side of piston A would be moved out through outlet (3 OUT). FIG. (3) illustrates the situation after piston A has reached position 2. Now piston A becomes the first piston which is held tight at position 2 and piston B becomes the second piston which has been released. Simultaneously the valves (3 IN.) and (3 OUT) become closed and the valves (2 IN) and (2 OUT) become opened. As piston A is the first piston, which is held tight at position 2 and the volume flows via inlet (2 IN) into the space lying at the counterclockwise side of piston A, piston B will move counterclockwise to position 1, whereas the volume of the space, which is lying at a counterclockwise side of piston B is removed via outlet (2 OUT). Now piston B becomes the first piston, which is held tight at position 1 and piston A becomes the second piston, which will be released. Simultaneously the valves (2 IN) and (2 OUT) will be closed and the valves (1 IN) and (1 OUT) will be opened. The cycle starts again, just piston A and piston B have exchanged position.

In respect to gas flow directions and pressure conditions, different valve mechanisms can be used. All valve mechanisms control two different main flows: 1. At least one flow is into the measuring vessel, which flows into the increasing space between the pistons. 2. At least one flow is out of the space at the other side of the pistons, which leaves the measuring chamber.

In an advantageous exemplary procedure carrying out the invention, a first valve plate 26, bearing openings for the inlet and outlet passages is moved covering a second valve plate 28 bearing inlet and outlet ports of the measuring chamber. Thus, the flow-regulating valves comprise relatively-rotating first and second valve plates lying side by side. If the pistons should be stopped at 3 positions, 6 different openings (3 inlet and 3 outlet ports) should be provided. In this case the valve plate should be moved over a triangular course, with all ports, which are to be closed being covered by the valve plate, while the inlet/outlet openings which should be opened remain uncovered by the valve plate, because the openings of the valve plate are positioned among the openings of the measuring chamber.

Figure 4:
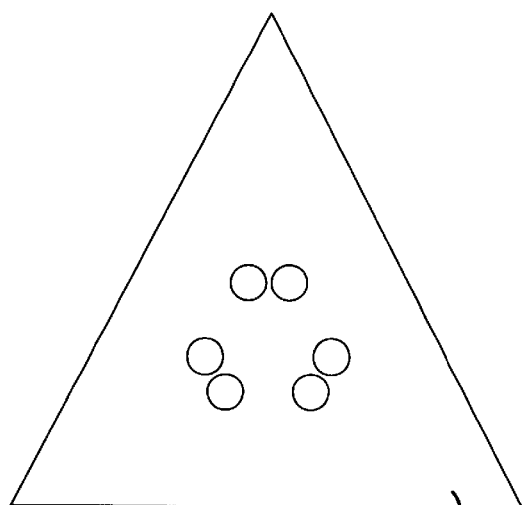
FIG. 4 is a side view of a valve plate that can be used in the embodiment of FIGS. 1–3.

FIG. 4 illustrates a valve plate having three inlet and three outlet openings for three retaining points.

Figure 2:
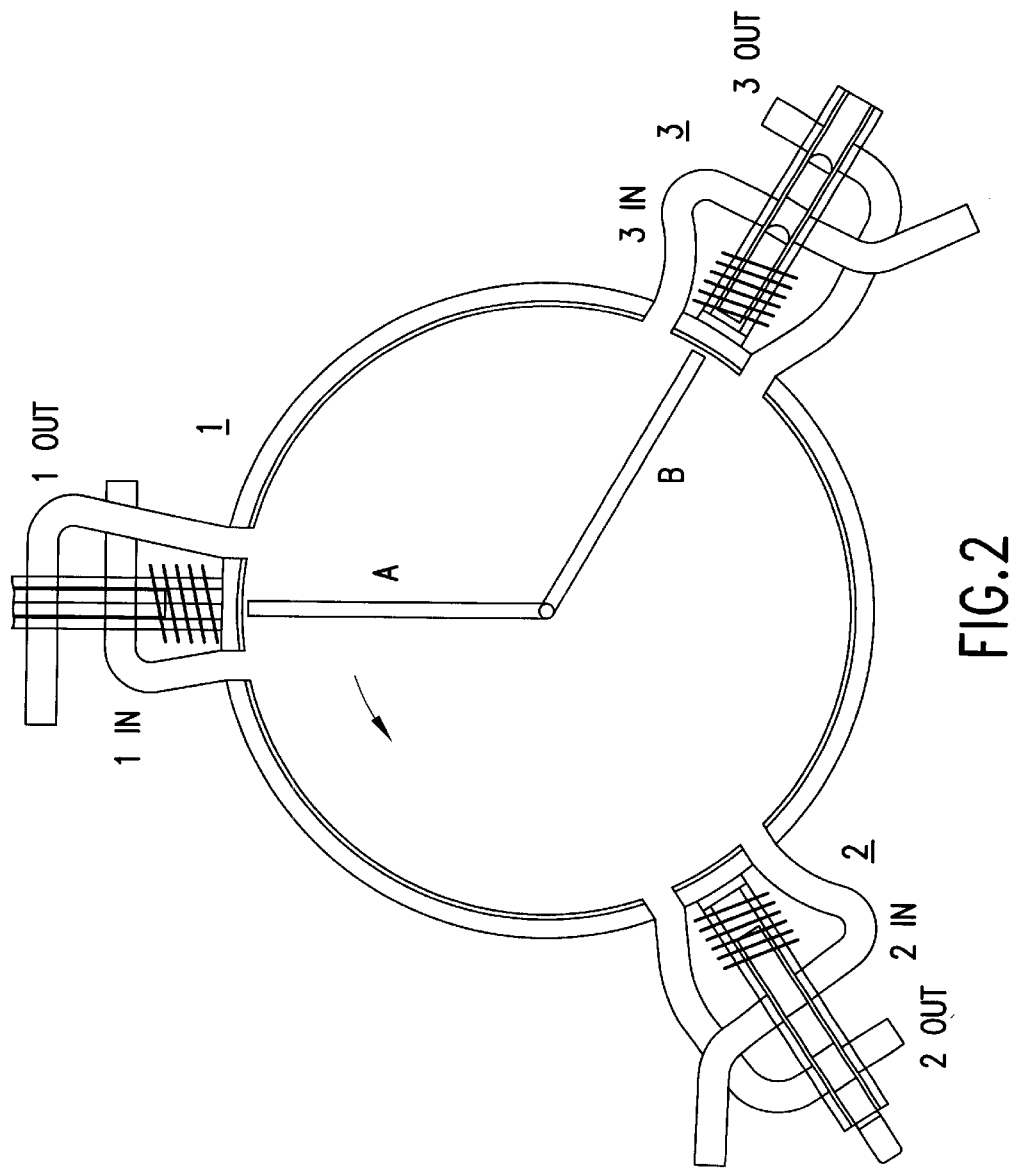
Figure 3:
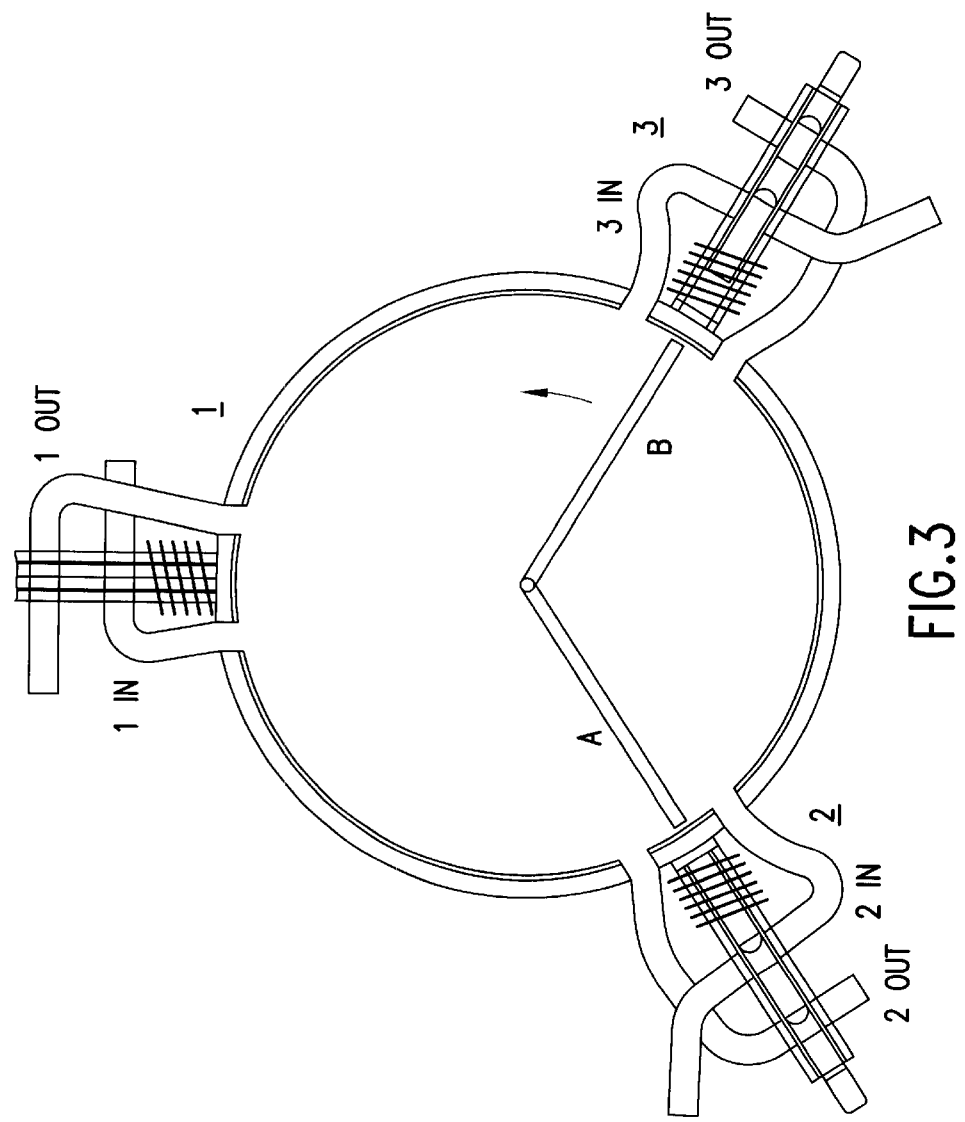
Figure 5:
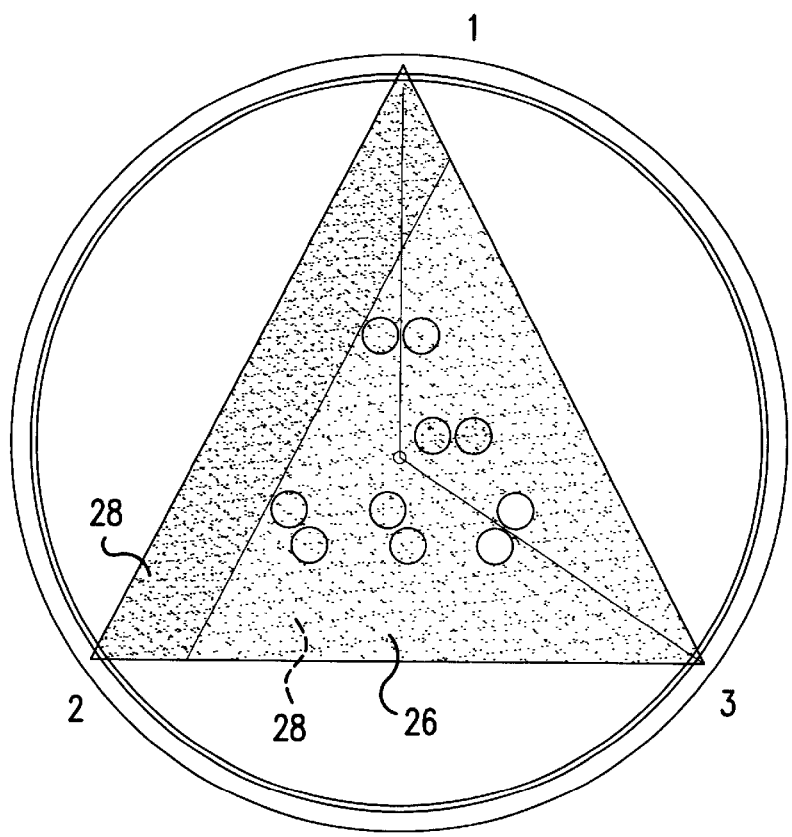
FIG. 5 is a side schematic view of the valve plate over a rotating valve piston for use in the embodiment of FIGS. 1–3.

FIG. 5 illustrates schematically the valve plate over a rotating piston device, with a first piston being held tight at position 3, and with a second piston standing at position 1. The valve plate only provides openings at both sides of the first piston at position 3. If two pistons are moved around a circle containing 4 retaining points the valve plate should contain 8 holes etc. Advantageously the valve plate can be moved by the same force, which locks the rotating pistons, such as electromechanical coils 22 shown in FIGS. 1–3, which involves integrating solenoids into the first and second pistons. However, the holding means could also be mechanical or pneumatic. Other types of linkages between the valves and pistons could also be used.

Figure 6:
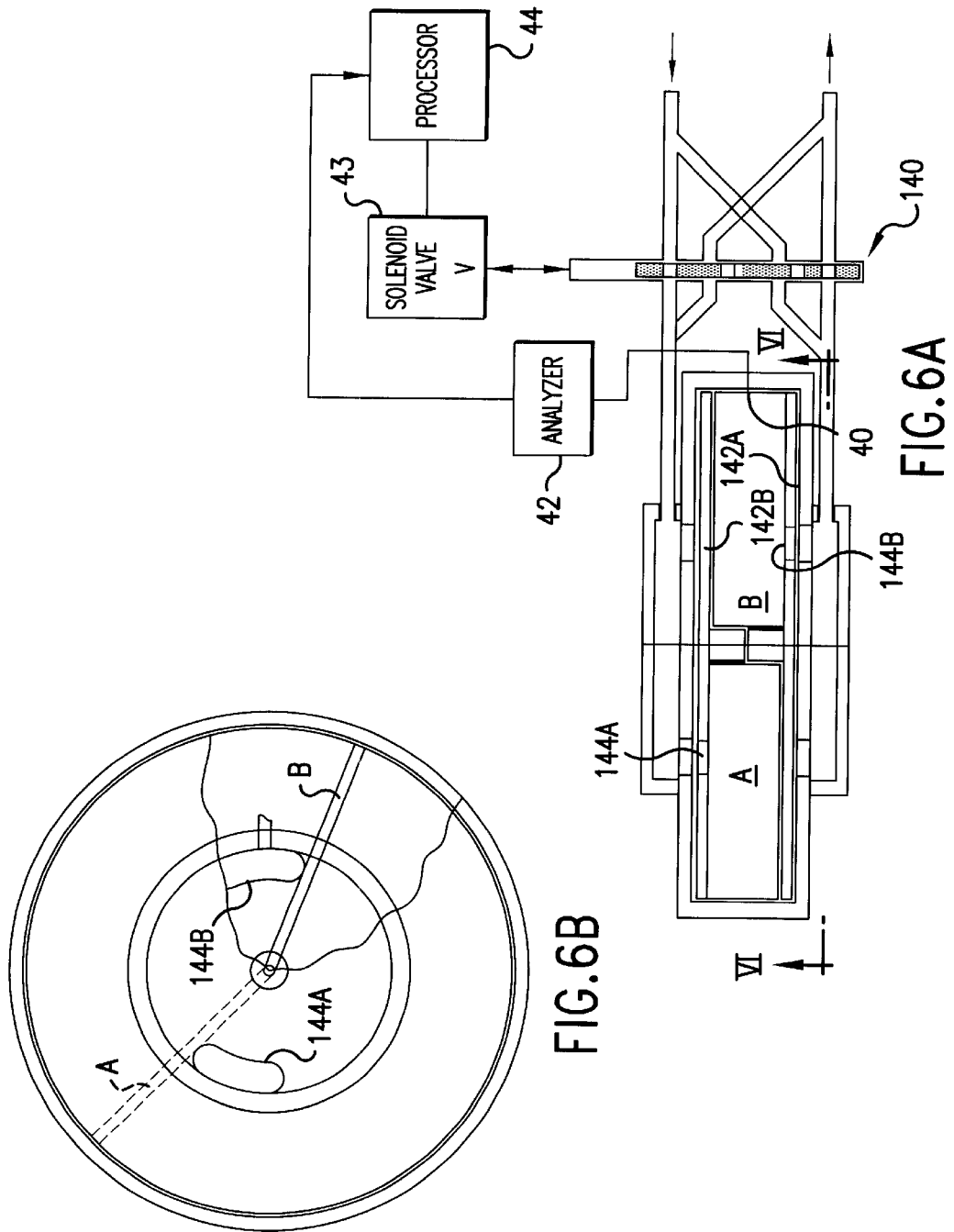
FIGS. 6A and B are side and edge schematic cross-sectional views of a second embodiment device according to this invention, with FIG. 6 being a fragmented, cutaway cross-section taken on line VI—VI of FIG. 6A.

In a further advantageous application of the invention, an external valve system 140 is combined with two valve plates 142A and B, each attached to one piston A, B, or rotating with a piston (FIG. 6A). The gas or liquid flow is controlled by openings 144A, B, built into, or integrated into, the valve plates 142A, B, rotating with each piston. The openings 144A, B, of the valve plates 142A, B, allow access either to the spaces lying at the counterclockwise side of the pistons or lying at the clockwise side of the pistons. If a volume enters through one side of the valve plates i.e. through the plate 142B with the opening at the space lying at the clockwise side of the first piston A, the second moveable piston B will start to move and the space lying at the clockwise side of the first piston will be increased. On the other hand the volume lying on the other side of the two pistons will be decreased and an aliquot volume will be moved through the opening 144B at the clockwise side of the first piston A. If the volume is alternately pumped in, and let out, while the holding mechanism operates, an alternating rotation of the pistons will be performed in one direction.

Figure 7:
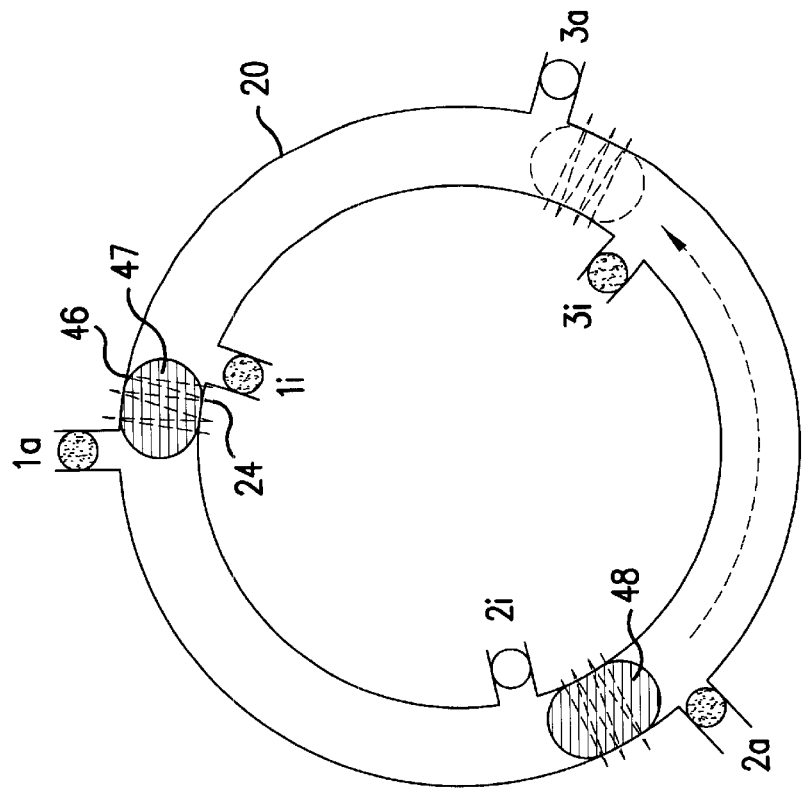
FIGS. 7A and B are respectively a chart and a side schematic cross-sectional view illustrating operation of a third-embodiment device of this invention.

A further exemplary procedure carrying out the invention comprises at least two pistons, which are not pivoted, which are rounding in a tubular pipe 20, which can be circular, whereas the volume to be measured is moved into at least one space between at least one first piston 47, which is held at a fixed position by one of solenoid coils 46 and at least one second movable piston 48, wherein the non fixed piston 48 is moved by the expanding volume. An aliquot volume of the pipe system, which is insulated from the first volume by at least one movable piston, is displaced and moved through an outlet 3a. FIG. 7B illustrates the piston and gas movements, the valves 1i, 1a, 2i, 2a, 3i, 3a, and two tables including possible valve settings. Here, the holding means are electromechanical coils 24, which again involves integrating solenoids into the first and second pistons.

Instead of two pistons, which are moved in a rotation parabolic vessel, as described above, a plurality of at least two bellows 200a, 200b are moved around a common axle 202. The stiff parts of the bellows-like frames or completion plates 206a, 206b, of the expandable wrapping pivot on the common axle 202. The at least two bellows 200a, 200b are circularly attached to the at least two mutual completion plates 206a, 206b, which insulate the volumes. By mechanical or magnetic means each completion plate can be held tight at a fixed position. An advantageous valve mechanism 208 controls the inlet and outlet flows of the machine. If the volume to be measured is moved into the space, which is surrounded by one first completion plate, which is hold tight at its position and the flexible wrapping and a second completion plate, which can be moved, the volume of the bellows will increase and the second completion plate will be moved, the frames and flexible wrapping will unfold and expand in an orbital shape, while the second bellows will fold up and decrease its volume. The advantage of the rotating bellows mechanism is, that the expanding and increasing bellows do not go past their inlet or outlet valves. The inlet and outlet ways 210 rotate all in all with the bellows. Depending on the arrangement of the valves the direction of the completion plate movement can be fixed.

For a calculation of the moved volumes the measurement of the angles, which have been covered by the pistons should be taken. For arrangements using a common axle the measurement can be performed by mechanically coupling to the piston movement. On the other hand the actual piston movements and positions can be measured with lower mechanic influences upon the piston movement by a sufficient number of (electromagnetic) sensors 40 (FIG. 1), which information is sent to an analyzer 42. In an advantageous application carrying out the invention, solenoids are integrated into the rotating pistons for the purpose of holding and moving the pistons as illustrated by coils 46 for clamping pistons 47 in FIG. 7B. If these solenoids are moved through an electromagnetic field an electrical current can be applied using a measuring amplifier. If the solenoids are built into the wall of the measuring chamber, an electric current can be applied if a magnetic force is integrated into the rotating pistons. Depending on the piston position, the action of solenoid valves 43 can be controlled by a processor 44. If the rotating velocity of the pistons is influenced by magnetic, pneumatic or mechanic means like solenoids, the flow and pressure dynamics of gas or liquid volumes passing the mechanism can be arbitrarily modified. If the pistons are moved by outward forces the device can be used as pump. A further advantage of the invention is, that the pistons move only in one direction. This feature allows reduction of the friction of gaskets, which insulate the pistons. Depending on the angle between a flexible gasket and the wall of the measuring chamber, the thrown up gas or liquid volume can increase or reduce the pressure of the piston gasket against the wall. The thrown up volume can increase the friction of the gasket if the gasket is pressed against the wall of the measuring chamber. On the other hand it can decrease the friction of the gasket if it reduces the pressure of the piston against the wall. If the measured volume is moved into the measuring chamber via nozzles leading into the measuring chamber, the piston should require overlapping parts or gaskets, which cover the nozzle from a passing piston, whereas no gas or liquid volume can bypass to the other side of the piston. In a further application the minimal angle and distance between the pistons or blades can be controlled by buffers fixed to the pistons.

Figure 8:
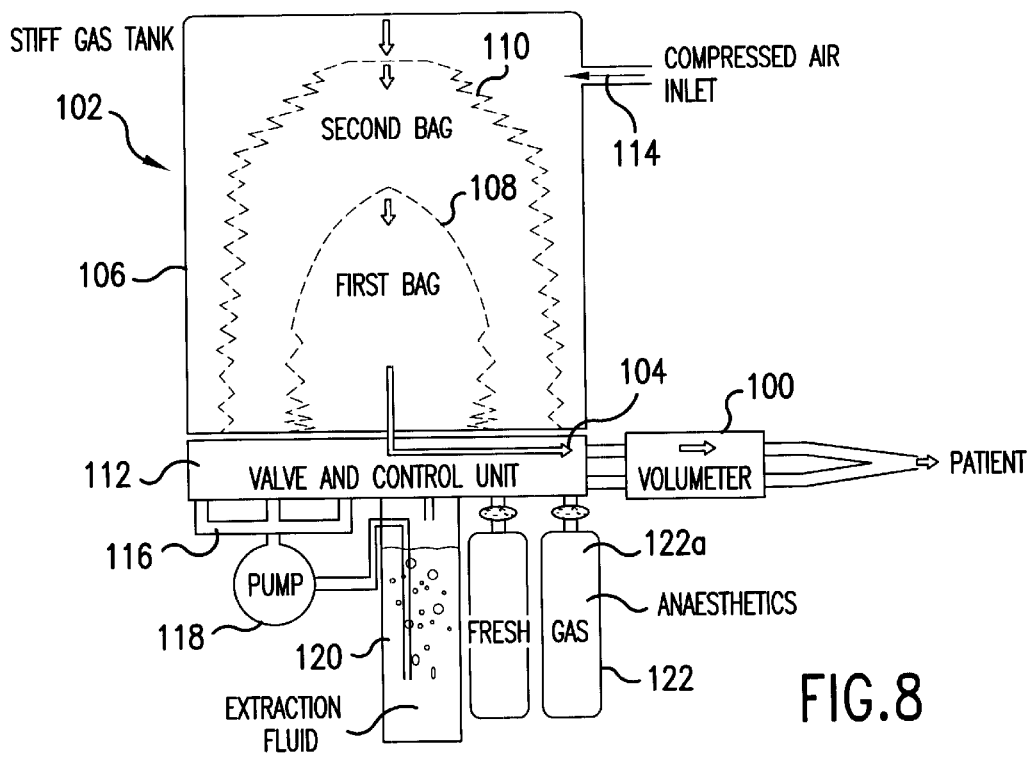
FIGS. 8 and 9 are schematic representations of a respiration system combining a volume measurement device with a bag-in-bag respirator of this invention in respective inhale and exhale modes of operation.
Figure 9:
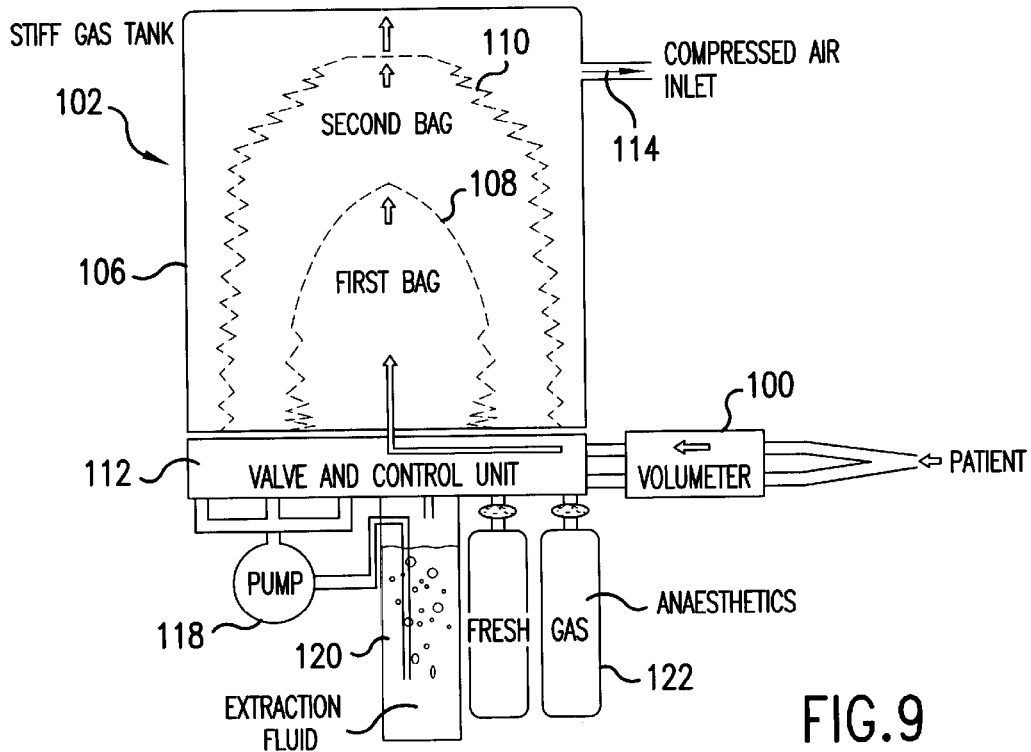
Figure 10:
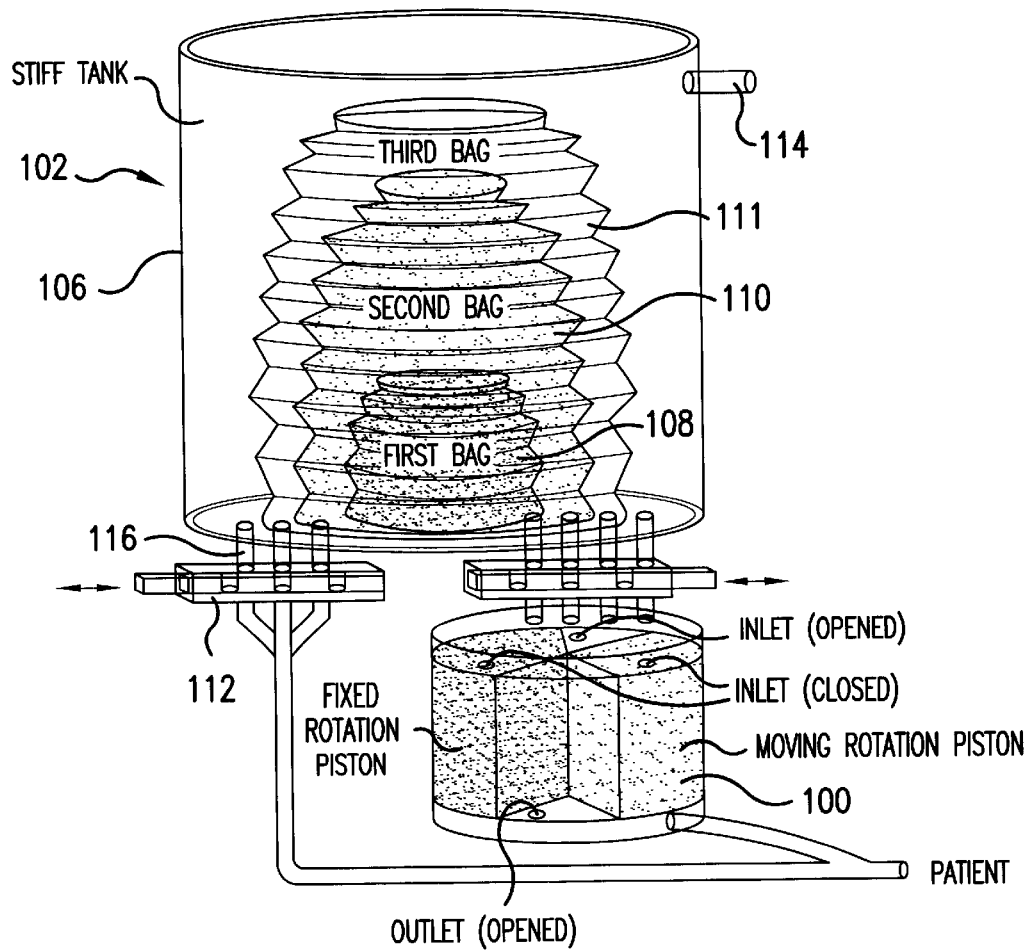
FIG. 10 is another schematic representation of the system of FIGS. 8 and 9, but showing more structure of the valves and volume measurement device, and an additional bag in the respirator.
Figure 11:
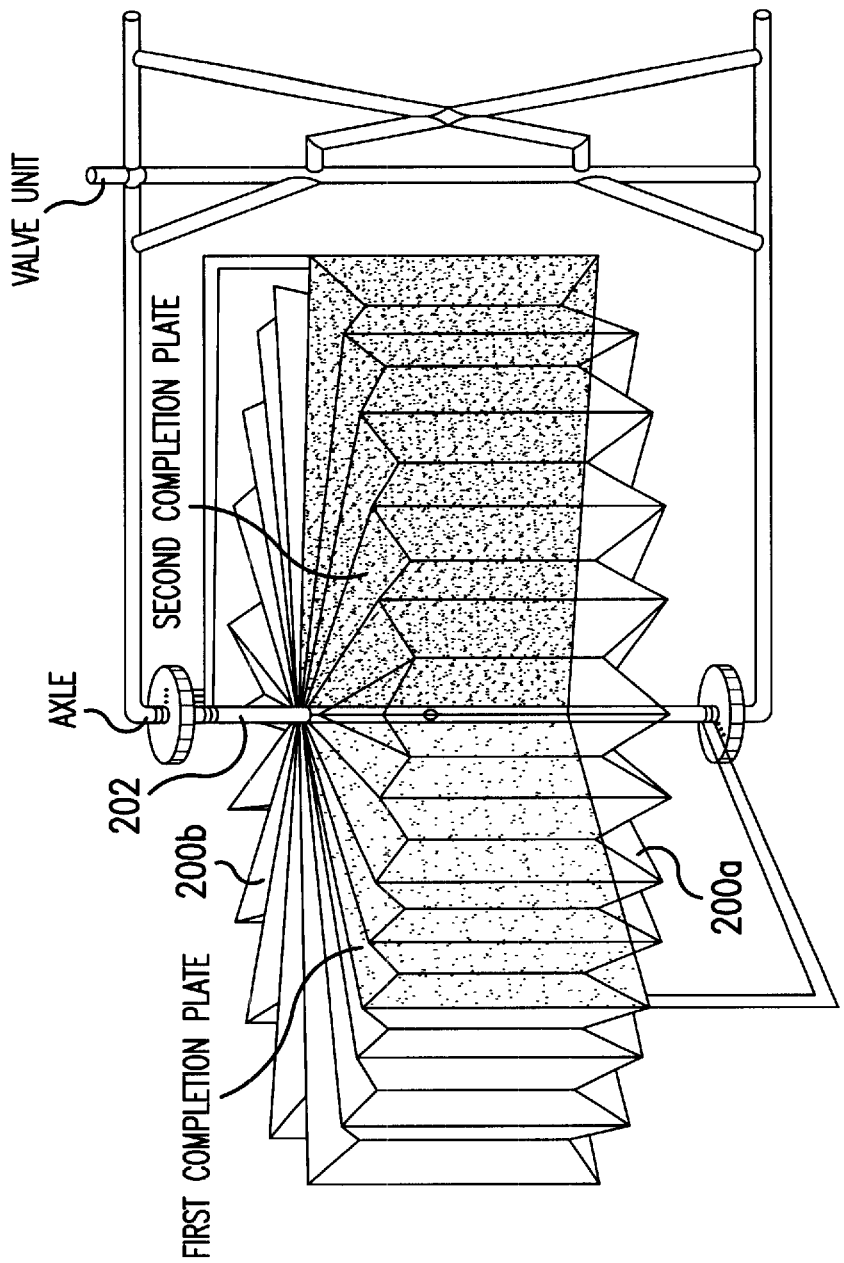
FIG. 11 is an isometric schematic representation of a bellows device for the movement and volume measurement of fluids of this invention.
Figure 12:
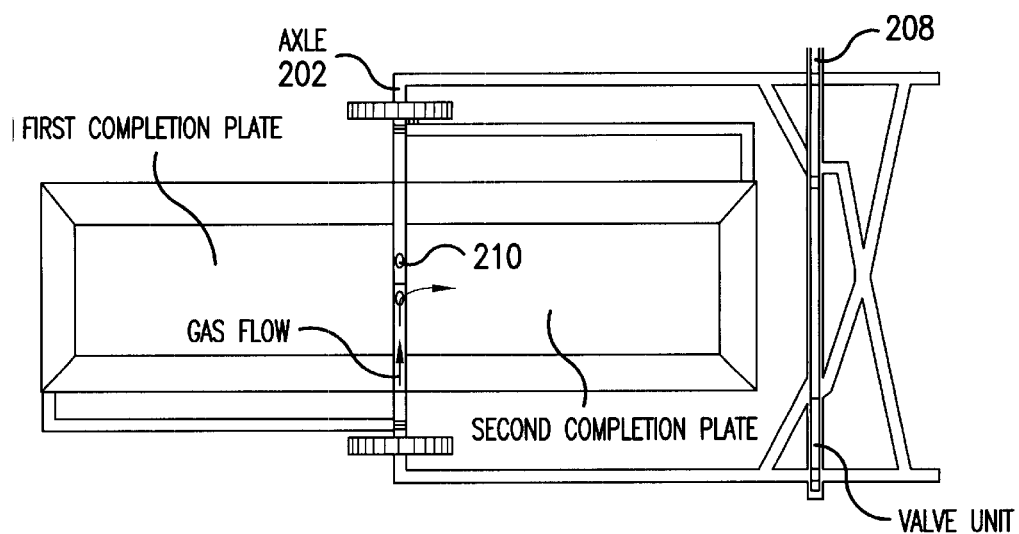
FIG. 12 is a cross-sectional view of the device of FIG. 11.
Figure 13:
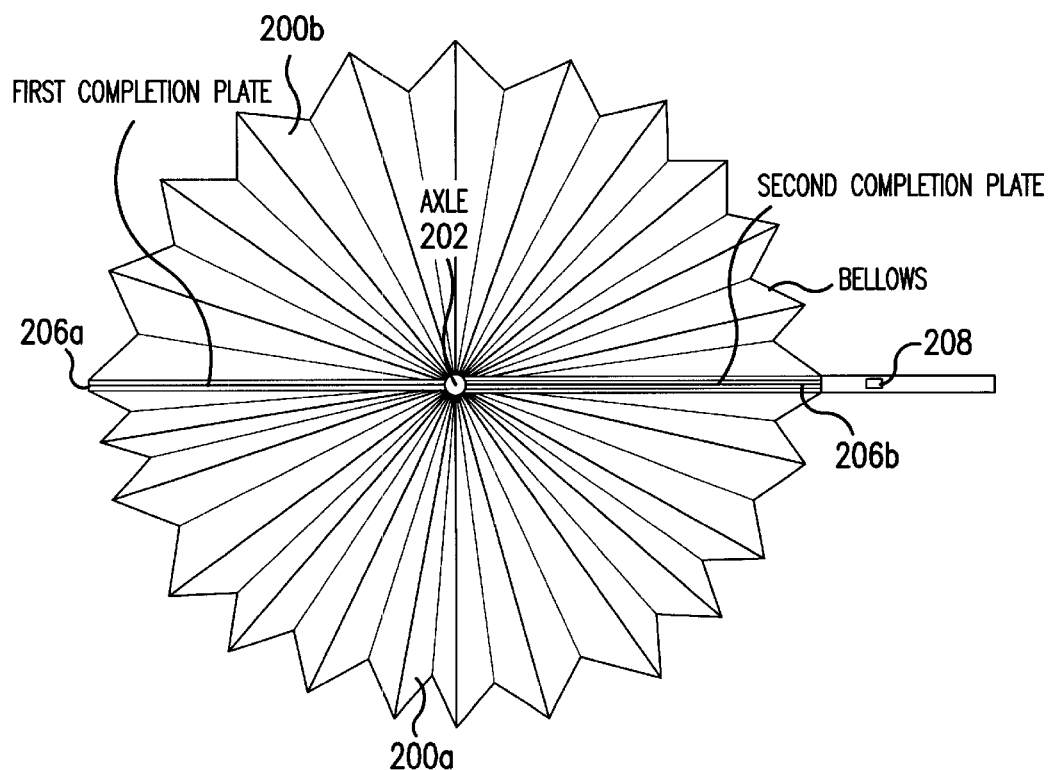
FIG. 13 is a plan view of the device of FIG. 11.

In an additional exemplification for carrying out the invention (see FIGS. 8 and 9) a rotation piston device 100, of the type shown in FIG. 1, for example, is used for the measurement of gas movements performed by a mechanical respirator 102. In this case the respiration gas 104 is withdrawn from a closed bag system 106 of the respirator 102, comprising at least two flexible gas bags 108 and 110, one inserted into the other, whereas at least one is a smaller flexible gas bag 108 which is inserted into the other, second, bigger flexible gas bag 110, wherein compression of the outer second gasbag 110 causes compression of all gas bags therein. Depending on valve settings of the valves 112 of the respirator 102 and measurement of the rotational piston device 100 the content of one or more flexible gas bags can be provided to a patient. If a compression of the second, outer, flexible gas bag 110 is performed by insertion of compressed air, the gas of the first and second flexible gas bags 108 and 110 will escape from the bags from which outlet valves have been opened, while the gas will remain in those gas bags for which outlet valves have been kept close.

In an advantageous procedure and device for carrying out the invention, the inserted flexible gas bags are connected by pipes 116 and a pump 118 and the gas can be moved to and fro between the first and second flexible bags 108 and 110, while the content of the these flexible gas bags will leave the system after compression with the compressed air 114 when their valves have been opened. If the flexible gas bags 108 and 110 are inserted into one another as described above, an equal pressure is weighing upon each of them. A gas volume which is moved between the inserted flexible gas bags does not influence the pressure weighting upon both of them, because a gas volume which has been taken away from one flexible gas bag is added to the other flexible gas bag in the system. So at least a part of the respirator gas volume can be passed through extraction media, or fluid, 120 for example active carbon, soda lime or special extraction fluids, with a minimal impairment of pressure and flow dynamics of a mechanical ventilation driven by compressed air, FIG. 8. By the insertion (one into another) of flexible gas bags 108 and 110 a pressure coupling can be performed with minimal volume requirements. Using very precious (Xenon) or polluting (chlorofluorocarbons, CFCs) volatile anesthetics 122, the respirator volume of the interior first bag 108 can be taken to an outer gas bag by a regulating valve, if the bag system has been overloaded or the pressure has been to high, thus the respirator gas is retained in the respirator system and does not escape to the atmosphere. The pressure coupling provides the use of the pump 118, which withdraws gas from at least one flexible gas bag and fills it into at least one other inserted gas bag. The gas can cross the extraction media 120 with higher pressures, without impairment of the respiration pressures. In an additional exemplary procedure carrying out the invention, gases and volatile anesthetics 122 can be pumped through fluids, which have a higher solubility for these volatile anesthetics, whereas they are extracted from the gas.

The respirator can include a container 122a for holding liquids in which vital anesthetics of the respirator are held. It could also include a container 122a in which vital anesthetics of the respirator system are solved or released from, materials such as fats, oils, paraffin oil, saturated and unsaturated fatty acids, aliphatic substances, lipophile mixtures or emulsions.

What is claimed is:

1. A device for movement and measurement of a fluid volume, with the fluid volume being defined in a measuring chamber of a rotation vessel by at least first and second pistons movable within the measuring chamber, said pistons separating the fluid volume and indicating fluid-volume movement into and out of the measuring chamber via flow-regulating valves, the device comprising:

the rotation vessel;

the flow-regulating valves;

the at least first and second pistons, which are alternately rotated and held fixed;

holding means for alternately fixedly holding the first and second pistons within the measuring chamber;

wherein, during a first cycle phase, a volume of fluid flows into a first measuring space within the measuring chamber, said first measuring space being defined by at least the first piston, which is held fixed within the measuring chamber by the holding means, and by at least the second piston, which is movable within the measuring chamber; and wherein, during a second cycle phase, the volume of fluid in the first measuring space flows out of the first measuring space as the second piston is held fixed within the measuring chamber by the holding means and the first piston is movable within the measuring chamber;

wherein the first measuring space is separated from a second measuring space of the measuring chamber by at least one of said first and second pistons.

2. The device of claim 1, wherein the rotation vessel is a tubular pipe in the form of a closed loop and said at least two pistons are alternately rotated and held fixed about the loop of the tubular pipe.

3. The device as in claim 1, wherein the holding means for selectively holding the first and second pistons fixed within the measuring chamber is an electromagnetic mechanism.

4. The device of claim 1, wherein the flow-regulating valves are integrated into the pistons.

5. The device of claim 1, wherein the flow-regulating valves are positioned outside of the measuring chamber.

6. The device of claim 1, wherein the flow-regulating valves are driven by linkage with the first and second pistons.

7. The device of claim 1, wherein the holding means includes solenoids that are integrated with the first and second pistons.

8. The device of claim 1, wherein said second measuring space is separated from said first measuring space by said first and second pistons and wherein a valve of the flow-regulating valves for allowing the volume of fluid to flow out of the first measuring space within said measuring chamber during said first cycle phase has a separate control from a valve of said flow-regulating valves which controls outflow of fluid volume from the second measuring space within the measuring chamber during said second cycle phase.

9. The device of claim 8, wherein is further included separate inlet and outlet tubes associated with each valve of said flow-regulating valves for simultaneously allowing fluid to flow into one of said first and second measuring spaces and out of the other of said first and second measuring spaces.

10. The device of claim 9, wherein the inlet and outlet tubes are crossed.

11. The device of claim 1, wherein is further included sensors linked to the first and second pistons for providing information concerning positions of the first and second pistons.

12. The device of claim 11, wherein is further included a processor controlling opening and closing of valves of the flow-regulating valves and receiving information from the sensors.

13. The device of claim 1, wherein valves of the flow-regulating valves comprise relatively-rotating first and second valve plates lying side by side and rotating relative to each other, each valve plate having a plurality of openings therein, wherein open passages for fluid flow into and out of the measuring chamber are provided by coinciding openings of the first and second valve plates and closed passages are caused by non-coinciding openings of the first and second valve plates.

14. Device as in claim 1, wherein the rotation vessel comprises at least two bellows, and wherein the first and second pistons are two stiff plates forming ends of the two bellows, which plates pivot on a common axis.

15. The device as in claim 1, wherein the first and second pistons rotate in the same direction during successive cycles.

16. A respiration system comprising the device of claim 1 for implementing respiration, said respiration system further including:

a respirator comprising a plurality of flexible gas bags, an outer tank and respirator valves, wherein a first flexible gas bag is positioned inside a second flexible gas bag and both first and second gas bags are positioned inside a stiff tank, with the respirator being connected to the device for the movement and measurement of fluid volumes via said respirator valves;

wherein compression within said stiff tank on the second flexible gas bag causes compression of both the second and first flexible gas bags, with gas in the flexible gas bags being thereby propelled to a patient by the respirator via the respirator valves and the device for the movement and measurement of fluid volumes.

17. The device of claim 16, wherein said respirator includes a container for holding a liquid vital anesthetic.

18. The device of claim 16, wherein the respirator includes a material in which a vital anesthetic of the respirator system is released, wherein said material is chosen from one of fats, oils, paraffin oil, saturated and unsaturated fatty acids, aliphatic substances, lipophile mixtures or emulsions.

19. A method for movement and measurement of fluid volumes with a fluid volume being defined in a measuring chamber of a rotation vessel by at least first and second pistons movable within the measuring chamber, said first and second pistons separating and indicating the fluid volume of fluid moved into and out of the measuring chamber via flow-regulating valves, the method comprising first-measuring-space cycle steps as follows:

opening a first of the flow-regulating valves leading into a first measuring space within the measuring chamber to flow a first volume of fluid into the first measuring space, the first measuring space being limited by at least the first piston that is held fixed within the measuring chamber while the second piston is allowed to rotate away from the first piston; and opening a second of the flow-regulating valves leading from the first measuring space to flow the first volume of fluid out of the first measuring space, the first measuring space now being defined by at least the second piston that is held fixed while the first piston is allowed to rotate toward the second piston.

20. The method for movement and measurement of fluid volumes as in claim 19, wherein the first-measuring-space cycle steps are repeated with the first and second pistons always being rotated in the same direction within the measuring chamber.

21. The method for movement and measurement of fluid volumes as in claim 19 wherein the first measuring space is separated from a second measuring space of the measuring chamber by said first and second pistons, and wherein as the first-measuring-space cycle steps are carried out for the first measuring space identical second-measuring-space cycle steps are carried out for the second measuring space, but in reverse order.

22. A method of respiration, including the method of claim 19 for movement and measurement of fluid as a sub-step for measuring fluid flow to and from a patient, and further including the steps of:

providing a respirator comprising a plurality of flexible gas bags and an outer tank and respirator valves, wherein a first flexible gas bag is positioned inside a second flexible gas bag and both gas bags are positioned inside said outer tank, with the respirator being connected to the device for the movement and measurement of fluid volumes via said respirator valves;

providing compression within said outer tank on the second flexible gas bag, thereby causing compression of both the second and first gas bags for thereby propelling gas in the flexible gas bags to a patient via the respirator valves and the device for the movement and measurement of a fluid volume.

23. A method of respiration as in claim 21 wherein, during respiration, fluid is transferred between said first and second flexible gas bags and has substances extracted therefrom during this transfer.

* * * * *